United States Patent
Jang et al.

(10) Patent No.: US 10,819,799 B2
(45) Date of Patent: Oct. 27, 2020

(54) METHOD FOR DYNAMIC RETENTION OF HTTP SESSION INFORMATION AND WEB APPLICATION SERVER AND WEB SERVER USING THE SAME

(71) Applicant: TMAXSOFT. CO., LTD., Gyeonggi-do (KR)

(72) Inventors: Young Hwi Jang, Seoul (KR); Myung Sik Sung, Seoul (KR); Seung Wook Hwang, Gyeonggi-do (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 156 days.

(21) Appl. No.: 15/406,758

(22) Filed: Jan. 15, 2017

(65) Prior Publication Data
US 2017/0310760 A1    Oct. 26, 2017

(30) Foreign Application Priority Data
Apr. 20, 2016    (KR) .................. 10-2016-0048298

(51) Int. Cl.
| | | |
|---|---|---|
| *G06F 15/173* | (2006.01) | |
| *H04L 29/08* | (2006.01) | |
| *H04L 29/06* | (2006.01) | |

(52) U.S. Cl.
CPC .............. *H04L 67/14* (2013.01); *H04L 67/02* (2013.01); *H04L 67/1027* (2013.01); *H04L 67/16* (2013.01); *H04L 67/42* (2013.01)

(58) Field of Classification Search
CPC ..... H04L 67/02; H04L 67/1027; H04L 67/14; H04L 67/42
USPC ....... 709/201, 203, 204, 206, 223, 224, 226, 709/227, 229; 713/150, 155, 156, 168, 713/171
See application file for complete search history.

(56) References Cited

U.S. PATENT DOCUMENTS

| | | | | |
|---|---|---|---|---|
| 6,502,192 | B1 * | 12/2002 | Nguyen | .............. H04L 63/0428 709/229 |
| 2006/0080383 | A1 * | 4/2006 | Hasson | ................... H04L 67/14 709/203 |
| 2006/0190602 | A1 * | 8/2006 | Canali | ................ H04L 67/1029 709/226 |

(Continued)

FOREIGN PATENT DOCUMENTS

KR        1020050049978         5/2005

*Primary Examiner* — Dustin Nguyen
*Assistant Examiner* — Hao H Nguyen
(74) *Attorney, Agent, or Firm* — Husch Blackwell LLP

(57) ABSTRACT

A web server is provided. The web server includes a communication part for receiving an HTTP request from an entity connected by network and communicating with at least one WAS; and a processor for performing at least one of (i) a process of transmitting the HTTP request received from the entity to a specific WAS selected among the at least one WAS and then receiving information on an HTTP session corresponding to the specific WAS from the specific WAS when receiving an HTTP response from the specific WAS in response to the HTTP request, thereby retaining the information on the HTTP session and (ii) a process of transmitting a PING signal and then receiving the information on the HTTP session corresponding to the specific WAS from the specific WAS when receiving a PONG signal in response to the PING signal, thereby retaining the information on the HTTP session.

8 Claims, 4 Drawing Sheets

(56) References Cited

U.S. PATENT DOCUMENTS

| | | | | |
|---|---|---|---|---|
| 2007/0030826 | A1* | 2/2007 | Zhang | H04W 36/0011 |
| | | | | 370/331 |
| 2007/0061433 | A1* | 3/2007 | Reynolds | H04L 47/20 |
| | | | | 709/223 |
| 2007/0150600 | A1* | 6/2007 | Barsness | G06F 11/3447 |
| | | | | 709/227 |
| 2008/0049619 | A1* | 2/2008 | Twiss | H04L 69/329 |
| | | | | 370/236 |
| 2012/0066291 | A1* | 3/2012 | Grigorov | H04L 12/4633 |
| | | | | 709/203 |
| 2013/0190032 | A1* | 7/2013 | Li | H04L 67/26 |
| | | | | 455/517 |
| 2014/0095723 | A1* | 4/2014 | Ezell | H04L 67/141 |
| | | | | 709/227 |
| 2014/0242916 | A1* | 8/2014 | Bellamkonda | H04L 47/14 |
| | | | | 455/67.11 |
| 2015/0249586 | A1* | 9/2015 | Byers | H04L 67/2861 |
| | | | | 709/224 |
| 2015/0288643 | A1* | 10/2015 | Kumagai | G06Q 30/0635 |
| | | | | 705/26.81 |
| 2015/0334110 | A1* | 11/2015 | Bishop | H04L 67/16 |
| | | | | 713/156 |
| 2016/0099850 | A1* | 4/2016 | Haserodt | H04L 43/04 |
| | | | | 709/224 |
| 2017/0366467 | A1* | 12/2017 | Martin | H04L 47/2433 |

* cited by examiner

METHOD FOR DYNAMIC RETENTION OF HTTP SESSION INFORMATION AND WEB APPLICATION SERVER AND WEB SERVER USING THE SAME

CROSS REFERENCE TO RELATED APPLICATION

This application claims priority to and incorporates herein by reference all disclosure in Korean Patent Application No. 10-2016-0048298 filed Apr. 20, 2016.

FIELD OF THE INVENTION

The present invention relates to a method for retaining information on an HTTP session dynamically and a web application server (WAS) and a web server using the same and more particularly, to the method for retaining the information on the HTTP session as the method for the web server performing at least one of (i) a process of receiving an HTTP request from an entity connected by network and transmitting the HTTP request to a specific WAS selected among at least one WAS and (ii) a process of transmitting a PING signal to the at least one WAS and performing at least one of (i) a process of receiving information on an HTTP session corresponding to the specific WAS from the specific WAS when receiving an HTTP response from the specific WAS and thereby retaining the information on the HTTP session and (ii) a process of transmitting a PING signal and then receiving the information on the HTTP session corresponding to the specific WAS from the specific WAS when receiving a PONG signal in response to the PING signal, thereby retaining the information on the HTTP session and the web application server and the web server using the method.

BACKGROUND OF THE INVENTION

A web server means a server that receives a Hyper-Text Transfer Protocol (HTTP) request from a client, i.e., an entity requesting the World Wide Web (referred to as the "web") service, and provides a response to the HTTP request, i.e., content including a webpage, to the client. In addition, a web application server or WAS means middleware that executes an application for a client through HTTP over a network.

In general, a web service adopts an interactive client-server paradigm. In response to a user's input, an interactive browser-based application (or other applications using HTTP) running on a client sets a connection which is called an HTTP session by accessing a webpage retained by a server in a relationship with a server application. The server responds in real time and the browser, etc. render the response to display to the user. In the most basic dialog level, it may be configured that the HTTP session transmits a URL of a document required by a client thus requesting the document (such as a webpage) and the server transmits a copy of the requested document thus responding to it. In many cases, the HTTP session includes a much more complicated data exchange. For example, the user accesses an online shopping mall, searches for a variety of items (or different webpages) on an online catalog at the shopping mall, provides a search parameter to search for an item the user is interested in, selects a specific item to purchase and receives information on charging and delivery from the shopping mall. All of these are conducted in a context of one single HTTP session.

To support a complicated interactive exchange in an HTTP session, a server generally retains data including information on session, i.e., session-sustainable data. That is, the session-sustainable data represents data used to keep a session state and preserved in the server during the lifecycle of the session. These session-sustainable data are retained in the server throughout the interactive exchange between the client and the server when data packets are exchanged and the client moves from one webpage to another in the server environment. In general, the session-sustainable data are not repeated in individual data packets transmitted between the client and the server, but may also be updated by data generated internally by the server or by an input received from the client. These session-sustainable data are typically retained as session data objects such as Java™ Beans in the server.

In a server that provides a service to a client through the web, there may be multiple HTTP sessions where multiple clients are active at a certain moment. Recently, requests for web services based on the HTTP, from the development of web technologies, the spread of the Internet, and smart-phones, are continuously rising. In the future, the number of users of the web services will increase and the requests for handling HTTP sessions in web services are also expected to be on the rise because application services such as web games and social networking services (SNS) seem to be growing ever more popular. As such, in typical large web services, the number of simultaneously active sessions that must be supported may exceed the capacity of a single computer system. Nevertheless, the server must remain available and operational. Accordingly, a lot of service providers offer web services via a clustering method which is a method of linking many computer systems together to act like a single computer.

More specifically, one web server may handle an HTTP request by communicating with at least one WAS. Usually, the WAS may keep a user's logon state by using the HTTP session and if it is difficult to serve with one WAS, then several WAS are employed to provide identical service. In this case, one web server may communicate with several WAS and perform a function of distributing load on each WAS through an appropriate method.

In case of a new request without any HTTP session, the web server generally delivers it over to the WAS via round-robin. In case of a new request with an HTTP session, it is delivered to the WAS via sticky session routing. The round-robin refers to "a technique of delivering each request to each WAS in due turn" and the sticky session routing means "a method for delivering a request related to a particular session to a specific WAS retaining the session." In the general case, this method may be an appropriate method for balancing loads between individual WAS.

However, given the environment, including the cloud environment, where the configuration of the WAS is dynamically changed, a problematic situation may occur. For instance, while two WAS are being used, one more WAS may be added because there are considerable loads on the two WAS. This may mean that there are many HTTP sessions already attached to the two WAS. In response, one more WAS is added, but if the round-robin alone is used by each WAS for new requests, the web server would fail to distribute loads properly. Accordingly, to solve the problem, a technology of preventing WAS that is handling HTTP sessions from overloading and enforcing effective load distribution over all the WAS has become required.

SUMMARY OF THE INVENTION

It is an object of the present invention to retain information on an HTTP session of each WAS and enhance effective dynamic load distribution of a web server by using the information on the HTTP session under a situation where an additional WAS communicating with the web server is added or a configuration of the WAS is dynamically changed, or even under any other situation.

It is another object of the present invention to retain a consistently equivalent level of session load when several WAS handle identical services through such effective load distribution.

In accordance with one aspect of the present invention, there is provided a web server, including: a communication part for receiving an HTTP request from an entity connected by network and communicating with at least one web application server (WAS); and a processor for performing at least one of (i) a process of transmitting the HTTP request received from the entity to a specific WAS selected among the at least one WAS and then receiving information on an HTTP session corresponding to the specific WAS from the specific WAS when receiving an HTTP response from the specific WAS in response to the HTTP request, thereby retaining the information on the HTTP session and (ii) a process of transmitting a PING signal and then receiving the information on the HTTP session corresponding to the specific WAS from the specific WAS when receiving a PONG signal in response to the PING signal, thereby retaining the information on the HTTP session.

In accordance with another aspect of the present invention, there is provided at least one web application server, each including: a communication part communicating with a web server; and a processor for performing at least one of (i) a process of transmitting information on at least one HTTP session to the web server when transmitting an HTTP response to the web server in response to an HTTP request received from the web server through the communication part and (ii) a process of transmitting information on the at least one HTTP session to the web server when transmitting a PONG signal to the web server in response to a PING signal received from the web server through the communication part.

In accordance with still another aspect of the present invention, there is provided a method for a web server retaining information on an HTTP session, including steps of: (a) the web server performing at least one of (i) a process of transmitting an HTTP request received from an entity connected by network to a specific WAS selected among at least one WAS and (ii) a process of transmitting a PING signal to the at least one WAS; and (b) the web server performing at least one of (i) a process of receiving information on an HTTP session corresponding to the specific WAS when receiving an HTTP response from the specific WAS in response to the HTTP request, thereby retaining the information on the HTTP session and (ii) a process of transmitting a PING signal and then receiving the information on the HTTP session corresponding to the specific WAS from the specific WAS when receiving a PONG signal in response to the PING signal, thereby retaining the information on the HTTP session.

In accordance with still yet another aspect of the present invention, there is provided a method for at least one WAS supporting a web server to retain information on an HTTP session, including steps of: (a) the at least one WAS performing at least one of (i) a process of receiving an HTTP request received by the web server from an entity connected by network and (ii) a process of receiving a PING signal from the web server; and (b) the at least one WAS performing at least one of (i) a process of transmitting an HTTP response to the web server with information on an HTTP session corresponding to the WAS, thereby supporting the web server to retain the information on the HTTP session and (ii) a process of transmitting a PONG signal in response to the PING signal to the web server with the information on the HTTP session corresponding to the WAS, thereby supporting the web server to retain the information on the HTTP session.

BRIEF DESCRIPTION OF THE DRAWINGS

Drawings necessary to explain embodiments to show technical solutions more clearly in embodiments of the present invention will be described briefly. Clearly, the drawings presented as shown below are just part of the embodiments of the present invention and other drawings may be obtained based on the drawings without inventive work for those skilled in the art.

DETAILED DESCRIPTION OF THE PREFERRED EMBODIMENTS

Figure 1:
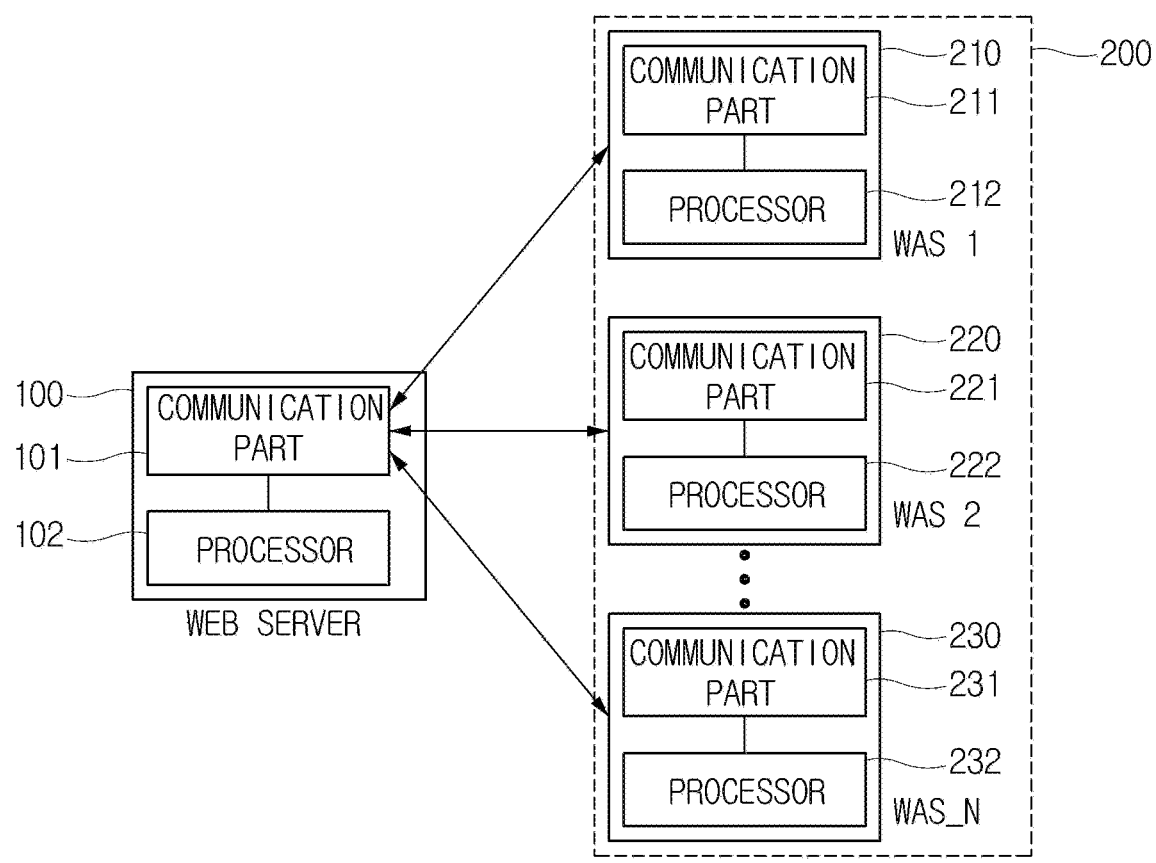
FIG. 1 is a block diagram exemplarily illustrating a web server and at least one WAS communicating with the web server.

To make the objectives of the present invention, technical solutions and advantages clear, detailed description of embodiments in which the invention may be implemented will be discussed by referring to attached drawings. These embodiments are described in sufficient detail to enable those skilled in the art to implement the invention.

Besides, in the detailed description and claims of the present invention, a term "include" and its variations are not intended to exclude other technical features, additions, components or steps. Other objectives, advantages and features of the present invention may be revealed partially from the specification and partially from the implementation of the present invention. The following examples and drawings may be provided as examples but they are not intended to limit the present invention:

It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, similar reference characters may refer to the same or similar functionality in several respects.

Unless otherwise indicated in the specification or clearly contradicted in the context, an item indicated in the singular includes those in the plural, unless otherwise required in the context. These embodiments may be described in sufficient detail by referring to attached drawings regarding the embodiments of the present invention to enable those skilled in the art to implement the invention.

FIG. 1 is a block diagram exemplarily explaining a web server 100 and at least one WAS 200 communicating with the web server.

By referring to FIG. 1, there may be one or more WAS 200 communicating with the web server 100. Herein, the individual WAS were introduced as WAS 210, 220 and 230. However, these are examples which are illustrated as a WAS1 210, a WAS2 220 and a WAS_N 230, but the number of WAS is not limited to these.

More specifically, the web server 100 may include a communication part 101 and a processor 102. The communication part 101 of the web server 100 may receive an HTTP request from an entity connected by network to the web server 100, e.g., a client (not illustrated), and communicate with the WAS 200. The processor 102 of the web server 100 may perform a process of retaining information on an HTTP session as explained below.

Moreover, the individual WAS 210, 220 and 230 may include communication parts 211, 221, and 231 and processors 212, 222, and 232. As an example, the communication part 211 of the WAS1 210 may communicate with the web server 100. The processor 212 of the WAS1 210 may perform a process of causing the communication part 211 to transmit information on at least one HTTP session retained by the WAS1 210 to the web server 100 and then supporting the web server 100 to retain the information on the HTTP session.

Figure 2:
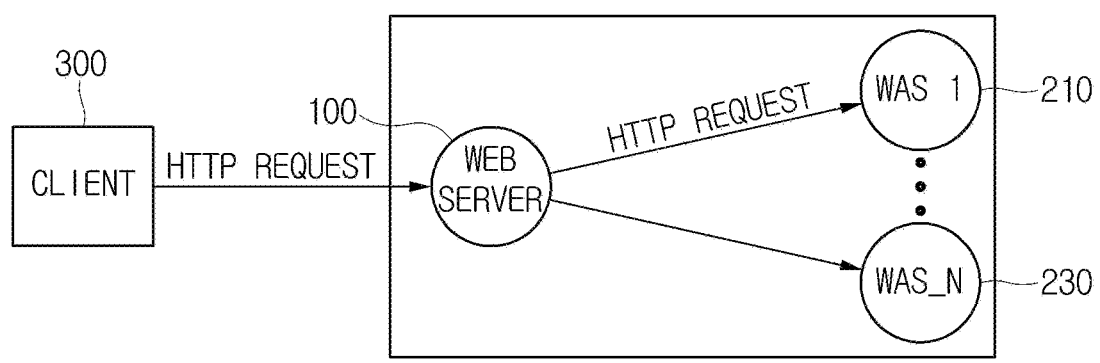
FIG. 2 is a concept diagram exemplarily illustrating a situation where the web server receives an HTTP request.

FIG. 2 is a concept diagram roughly illustrating a situation where the web server 100 delivers an HTTP request to the WAS1 210.

By referring to FIG. 2, if the web server 100 communicating with the at least one WAS 200 receives an HTTP request from a client 300 through the communication part 101 of the web server, then the web server 100 may deliver the HTTP request to a WAS (assumed as WAS1) under a certain distribution method. The certain distribution method may be round-robin, sticky session routing, or a distribution method in the present invention to be explained later. If the HTTP request is a new request without existing HTTP session, then an HTTP session may be created and newly retained in the WAS1 210.

Figure 3:
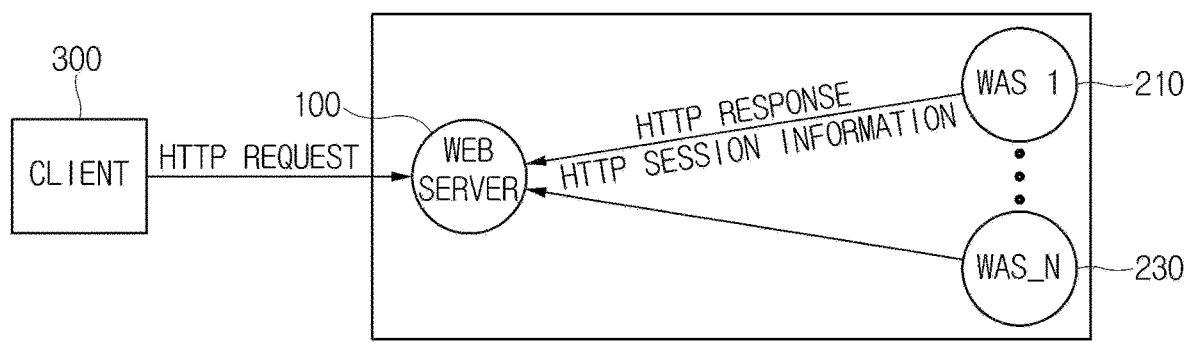
FIG. 3 is a concept diagram exemplarily illustrating a situation where the WAS transmits an HTTP response to the web server.

More specifically, an HTTP session has a characteristic of being destroyed under a timeout policy of the WAS or by logout of an HTTP client. Accordingly, to make information on an HTTP session retained and changed in real time on a WAS to be retained in a web server in real time under the situation, following methods are used:

A first method is to adopt a method for individual WAS creating a response to an HTTP request delivered by the web server 100, and giving information on an HTTP session when the response is delivered to the web server 100 as can be understood by referring to FIG. 3.

By referring to FIG. 3, the WAS1 210 in response to the HTTP request received from the web server 100 may create an HTTP response and then transmit it to the web server 100. At the time, the WAS1 210 may transmit information on an HTTP session corresponding to the WAS1 210 to the web server 100 as well as the HTTP response and thus the web server 100 may support the retention of the HTTP session information on the WAS1. Accordingly, the web server 100 may receive the information on the HTTP session of each WAS whenever it receives or transmits an HTTP request/response from/to each WAS and retain the information.

Figure 4:
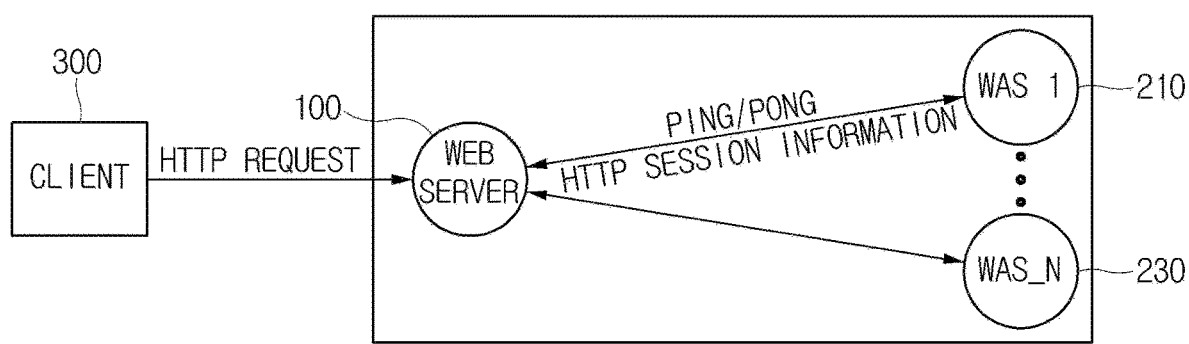
FIG. 4 is a concept diagram exemplarily illustrating a situation where the WAS transmits and receives PING/PONG signals to and from the web server.

A second method is to adopt a method for individual WAS creating a PONG signal corresponding to a PING signal delivered by the web server 100, and giving information on an HTTP session when the PONG signal is delivered to the web server 100, as can be understood by referring to FIG. 4.

By referring to FIG. 4, the PING signal and the PONG signal, separate from the HTTP request in FIG. 2 and the HTTP response in FIG. 3, may be used as means for managing connections between the web server 100 and the WAS 200 and the information on the HTTP session may be maintained highly accurate because the signal may be given and received even without any HTTP request. If the web server 100 transmits the PING signal to the WAS1 210 and the WAS1 210 receives the PING signal, the WAS1 210 may create the PONG signal in response to the PING signal and deliver it to the web server 100. At the time, the WAS1 210 may transmit information on an HTTP session corresponding to the WAS1 210 with the PONG response to the web server 100, and the web server 100 may receive and retain the information on the HTTP session of the WAS1. Accordingly, the web server 100 may receive and retain information on an HTTP session of each WAS whenever PING/PONG signals are given to, or received from, individual WAS 200. Even in a case where HTTP requests and HTTP responses are not continuously transmitted and received, the web server 100 may retain the information on the HTTP session of the WAS 200 through periodic renewals. Herein, transmission and reception of the PING signal may be performed regardless of an HTTP request or also if no HTTP request is detected for a certain period of time.

A third method is to adopt a method for using both the first and the second methods.

A method of retaining information on an HTTP session of a WAS in real time by a web server using such methods is provided.

If the web server 100 retains the information on the existing HTTP sessions of the WAS 200 under the method, then the web server 100 may use a distribution method which utilizes such information on the existing HTTP sessions upon determining to which WAS a new HTTP request with undefined HTTP session is delivered and its handling is allocated. For instance, there may be a distribution method for dynamically distributing load of an HTTP session based on a criterion that the new HTTP request should be delivered to a specific WAS whose load of the HTTP session is lowest. In addition, there may be other criteria for determining an appropriate WAS as a recipient for delivery.

Additionally, if the web server 100 retains the information on the existing HTTP session of the WAS 200 under the method, the web server 100 may use a distribution method which distributes existing load of the WAS even for a request whose HTTP session is already defined. Under a situation where there are few new requests, existing multiple WAS may have relatively large amounts of HTTP sessions (i.e. with higher loads). In such a case, for instance, the web server may use a method for dynamically distributing the load of an HTTP session based on a criterion where the web server reallocates and delivers the HTTP request and information on an existing HTTP session for an HTTP request whose HTTP session is already defined on a specific WAS, to another specific WAS with the lowest load of HTTP sessions. This may reduce the loads on the multiple WAS already with the relatively large number of HTTP sessions.

Compared to the existing method under which HTTP requests were distributed statically by a web server without knowing information on HTTP sessions retained by each WAS, an advantage of technology explained herein as the embodiment may be helpful for implementing a method for distributing the load of HTTP sessions of all WAS by using information on HTTP sessions retained by individual WAS even under a situation where configuration of WAS may be dynamically changed, as the web server retains the information on the HTTP session retained by each WAS. For example, parameters such as the number of HTTP sessions, size of an HTTP session information, amount of computation required per HTTP session, and overhead required to reallocate the HTTP sessions could be considered as the criteria for load of the HTTP session used for such distribution strategy.

As can be understood by those skilled in the art, reception and transmission of the signals explained above, such as HTTP request and response signals and PING and PONG signals, may be made by the web server and the communication parts of the WAS and data including information on an HTTP session may be retained and maintained by the web server and processors (and/or memories) of the WAS and processes of dynamic distribution of the HTTP session may be handled mainly by the processor of the web server but the present invention will not be limited to these. The description as explained above is one embodiment that may implement the present invention, but it is not intended to limit the present invention. Arbitrary modifications, equivalent alternatives and improvements in the principles and thought of the present invention will have to be included in the protective scope of the present invention.

Those skilled in the art may clearly understand that the present invention may be achieved only through combination of software and hardware or only through hardware based on the description of the aforementioned embodiment. The part contributing to the prior art or the object of a technical solution of the present invention may be expressed in a form of software, and the computer software products may be stored in computer storage such as floppy disk, hard disk, and optical media and computing devices (that may be personal computers, servers, network devices, etc.) include several instructions in aforementioned methods to configure hardware devices for general use to perform a method under a variety of embodiments of the present invention or implement a system mentioned in a variety of embodiments of the present invention. The general purpose hardware devices may include communication parts that may transmit or receive signals to or from external devices connected with a processor such as a CPU and a device separate from the aforementioned device to execute the instruction.

The processor may be connected with a memory such as ROM or RAM to store instructions as subjects of implementation, and such hardware device may also include a keyboard, a mouse, an external input device, or storage to receive codes prepared by developers.

In accordance with the present invention, a web server communicating with a WAS may retain information on an HTTP session of the WAS in real time, and recognize load distributed to each WAS because the web server may recognize the information on the HTTP session distributed over the individual WAS.

In accordance with the present invention, in consideration of the load and performance on the individual WAS, the web server may adopt a strategy for evenly distributing new HTTP requests (whose HTTP sessions are not defined) and existing HTTP requests (whose HTTP sessions are already defined) to the individual WAS, and may retain information on existing HTTP sessions required to distribution tasks as such at the same time.

In accordance with the present invention, it may be more favorable to a web service with relatively higher load of the HTTP request/responses, particularly, compared to the amount of the information on the HTTP session because the session information is managed between the web server and the multiple WAS.

What is claimed is:

1. A web server, comprising:
a communication part for receiving an HTTP request from an entity connected to the web server by a network and communicating with at least one web application server (WAS); and
a processor for (i) transmitting the HTTP request to a specific WAS selected among the at least one WAS in response to receiving the HTTP request from the entity, (ii) receiving information on an HTTP session corresponding to the specific WAS from the specific WAS simultaneously with receiving an HTTP response from the specific WAS in response to the specific WAS receiving the HTTP request, thereby retaining the information on the HTTP session at the web server, (iii) transmitting a PING signal to the specific WAS responsive to failing to receive a subsequent HTTP request from the entity during a specified period of time following delivery of the HTTP request to the specific WAS, and (iv) receiving the information on the HTTP session corresponding to the specific WAS from the specific WAS simultaneously with separately receiving a PONG signal from the specific WAS in response to the specific WAS receiving the PING signal, thereby again retaining the information on the HTTP session at the web server, and
wherein the information on the HTTP session includes a number of HTTP sessions managed by the specific WAS and an amount of overhead required to reallocate the HTTP sessions managed by the specific WAS to others of the at least one WAS;
wherein, if the communication part receives a new request whose HTTP session is defined and the HTTP session of the new request is allocated to a first WAS, then the processor reallocates and delivers the new HTTP request and the retained information on the HTTP session to a second WAS that meets a first predetermined allocation criterion by using the retained information on the HTTP session.

2. The web server of claim 1, wherein, if the communication part receives a new request whose HTTP session is undefined, then the processor newly allocates a handling of the new request whose HTTP session is undefined to a certain WAS that meets a second predetermined allocation criterion by using the retained information on the HTTP session.

3. At least one web application server (WAS), each comprising:
a communication part communicating with a web server; and
a processor for (i) receiving, through the communication part, an HTTP request from a web server in response to the web server receiving the HTTP request from an entity connected to the web server by a network, (ii) transmitting information on at least one HTTP session to the web server simultaneously with transmitting an HTTP response to the web server in response to receiving the an HTTP request (iii) receiving, through the communication part, a PING signal from the web server in response to the web server failing to receive a subsequent HTTP request from the entity during a specified period of time following delivery of the HTTP request to the processor, and (iv) transmitting the information on the at least one HTTP session to the web server simultaneously with separately transmitting a PONG signal to the web server in response to receiving the PING signal, and wherein the information on the HTTP session includes a number of HTTP sessions managed by a certain WAS and an amount of overhead required to reallocate the HTTP sessions managed by the WAS to others of the at least one WAS;

wherein, while the existing HTTP session of the request is allocated to a first WAS, if the web server intends to reallocate and deliver a new HTTP request and the retained information on the HTTP session to a second WAS that meets a first predetermined allocation criterion by using the retained information on the HTTP session, then the communication part of the second WAS receives information on a fact that the new request has been reallocated to the second WAS.

4. The WAS of claim 3, wherein, if the web server receives a new request where HTTP session is undefined and intends to newly allocate a handling of the new request whose HTTP session is undefined to a certain WAS that meets a second predetermined allocation criterion by using the retained information on the HTTP session, then the communication part of the certain WAS receives the information.

5. A method for a web server retaining information on an HTTP session, comprising steps of:
   (a) receiving an HTTP request from an entity connected to the web server by a network;
   (b) the web server (i) transmitting the HTTP request to a specific WAS selected among at least one WAS in response to receiving the HTTP request from the entity and (ii) receiving information on an HTTP session corresponding to the specific WAS simultaneously with receiving an HTTP response from the specific WAS in response to the specific WAS receiving the HTTP request, thereby retaining the information on the HTTP session at the web server; and
   (c) the web server (i) transmitting a PING signal to the specific WAS responsive to failing to receive a subsequent HTTP request from the entity during a specified period of time following delivery of the HTTP request to the specific WAS and (ii) receiving the information on the HTTP session corresponding to the specific WAS from the specific WAS simultaneously with separately receiving a PONG signal from the specific WAS in response to the PING signal, thereby retaining the information on the HTTP session at the web server, and
   (d) the web server, if receiving a new request whose HTTP session is defined and already allocated to a first WAS, then reallocating and delivering the new HTTP request and the retained information on the HTTP session to a second WAS that meets a first predetermined allocation criterion by using the retained information on the HTTP session;

wherein the information on the HTTP session includes a number of HTTP sessions managed by the specific WAS and an amount of overhead required to reallocate the HTTP sessions managed by the specific WAS to others of the at least one WAS.

6. The method of claim 5, further comprising a step of:
   (e) the web server, if receiving a new request whose HTTP session is undefined, newly reallocating a handling of the new request to a certain WAS that meets a second predetermined allocation criterion by using the retained information on the HTTP session.

7. A method for at least one web application server (WAS) supporting a web server to retain information on an HTTP session, comprising steps of:
   (a) the at least one WAS (i) receiving an HTTP request from a web server in response to the web server receiving the HTTP request from an entity connected to the web server by network and (ii) transmitting an HTTP response to the web server simultaneously with information on an HTTP session corresponding to the at least one WAS, thereby supporting the web server to retain the information on the HTTP session at the web server; and
   (b) the at least one WAS (i) receiving a PING signal from the web server in response to the web server failing to receive a subsequent HTTP request from the entity during a specified period of time following delivery of the HTTP request to the at least one WAS and (ii) transmitting the information on the HTTP session corresponding to the WAS to the web server simultaneously with separately transmitting a PONG signal in response to receiving the PING signal, thereby supporting the web server to retain the information on the HTTP session at the web server, and
   (c) while the web server receives a new request whose HTTP session is defined and already allocated to a first WAS, if the web server intends to reallocate and deliver the new HTTP request and the retained information on the HTTP session to a second WAS that meets a first predetermined allocation criterion by using the retained information on the HTTP session, then the second WAS receives information on a fact that the new request has been reallocated to the second WAS;

wherein the information on the HTTP session includes a number of HTTP sessions managed by a certain WAS and an amount of overhead required to reallocate the HTTP sessions managed by the WAS to others of the at least one WAS.

8. The method of claim 7, further comprising a step of:
   (d) if the web server receives a new request whose HTTP session is undefined and intends to newly reallocate a handling of the new request to a certain WAS that meets a second predetermined allocation criterion by using the retained information on the HTTP session, the certain WAS receiving information on a fact that the new request has been allocated to the certain WAS.

* * * * *